United States Patent [19]
Emery, Jr.

[11] Patent Number: 5,396,857
[45] Date of Patent: Mar. 14, 1995

[54] LAUNCHING DEVICE

[76] Inventor: Albert Emery, Jr., P.O. Box 288, Lincoln Park, Mich. 48146

[21] Appl. No.: 220,216

[22] Filed: Mar. 30, 1994

[51] Int. Cl.$^6$ .............................................. G08B 21/00
[52] U.S. Cl. ................................... 114/270; 340/438; 280/DIG. 14
[58] Field of Search ............... 114/344, 270; 340/431, 340/438, 686–689; 280/414.1, DIG. 14; 200/61.42, 61.44

[56] References Cited

U.S. PATENT DOCUMENTS

| | | | |
|---|---|---|---|
| 2,592,742 | 4/1952 | Rose | 200/61.44 |
| 3,104,770 | 9/1963 | Calkins et al. | 280/414.1 |
| 3,618,060 | 11/1971 | Nina | 200/61.42 |
| 3,995,251 | 11/1976 | Jones | 340/431 |
| 5,097,250 | 3/1992 | Hernandez | 280/DIG. 14 |

*Primary Examiner*—Edwin L. Swinehart
*Attorney, Agent, or Firm*—Michael I. Kroll

[57] ABSTRACT

A improved launching device is provided, which consists of a structure hitched to a motor vehicle for hauling a boat to a launch ramp that extends into a body of water. An apparatus on the hauling structure is for indicating to a driver of the motor vehicle, the point of buoyancy of the boat on the surface of the body of water. The hauling structure can be backed down just the right distance on the launch ramp into the body of water, to accomplish the task of launching the boat into the body of water.

2 Claims, 2 Drawing Sheets

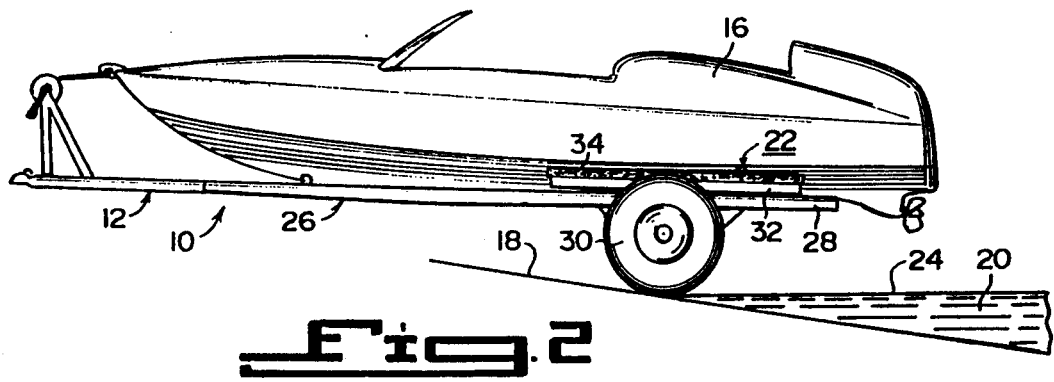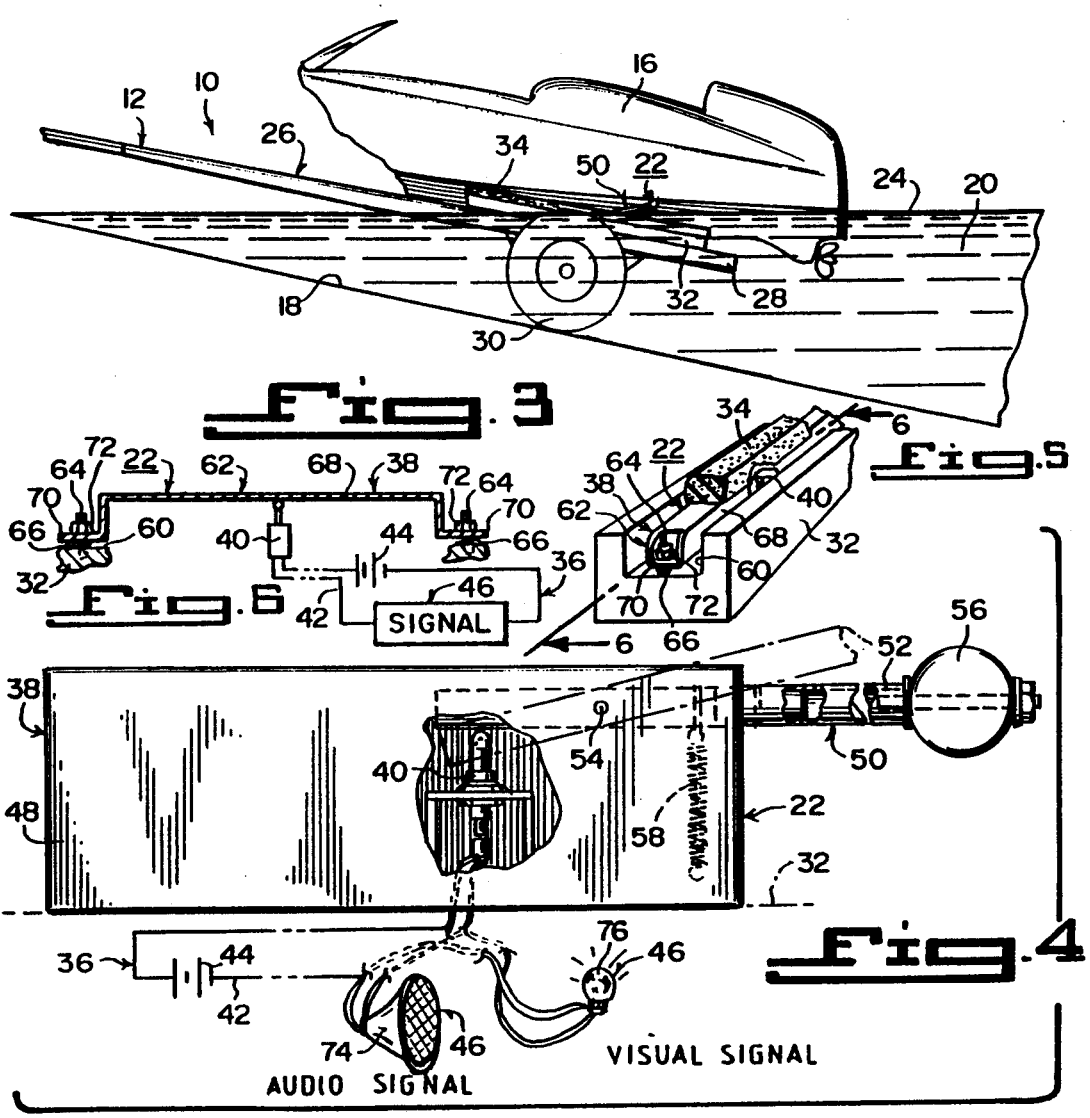

5,396,857

LAUNCHING DEVICE

BACKGROUND OF THE INVENTION

1. Field of the Invention

The instant invention relates generally to boat launchers and more specifically it relates to a signal improved launching device.

2. Description of the Prior Art

Numerous boat launchers have been provided in prior art that are adapted to place or lower boats into bodies of water, especially for the first time. While these units may be suitable for the particular purpose to which they address, they would not be as suitable for the purposes of the present invention as heretofore described.

SUMMARY OF THE INVENTION

A primary object of the present invention is to provide a improved launching device that will overcome the shortcomings of the prior art devices.

Another object is to provide a improved launching device that includes a boat trailer that has a built in apparatus to indicate to a driver of a motor vehicle hauling the boat trailer, the point of buoyancy of the boat on a surface of a body of water when the boat trailer is being backed down a launch ramp.

An additional object is to provide a improved launching device in which the built in apparatus is an electronic signaling system extending between the boat trailer and the interior of the motor vehicle.

A further object is to provide a improved launching device that is simple and easy to use.

A still further object is to provide a improved launching device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 2 is a side view of the boat trailer ready to be backed down the launch ramp into the body of water.

FIG. 3 is a side view similar to FIG. 2, showing the boat trailer down the launch ramp and the boat lifting off.

FIG. 4 is a side view with parts broken away of a first embodiment of the instant invention per se.

FIG. 5 is a perspective view with parts broken away of a second embodiment of the instant invention built into one of the bunks on the bed frame of the boat trailer.

FIG. 6 is a diagrammatic cross sectional view taken along line 6—6 in FIG. 5.

DETAILED DESCRIPTION OF THE PREFERRED EMBODIMENTS

Figure 1:
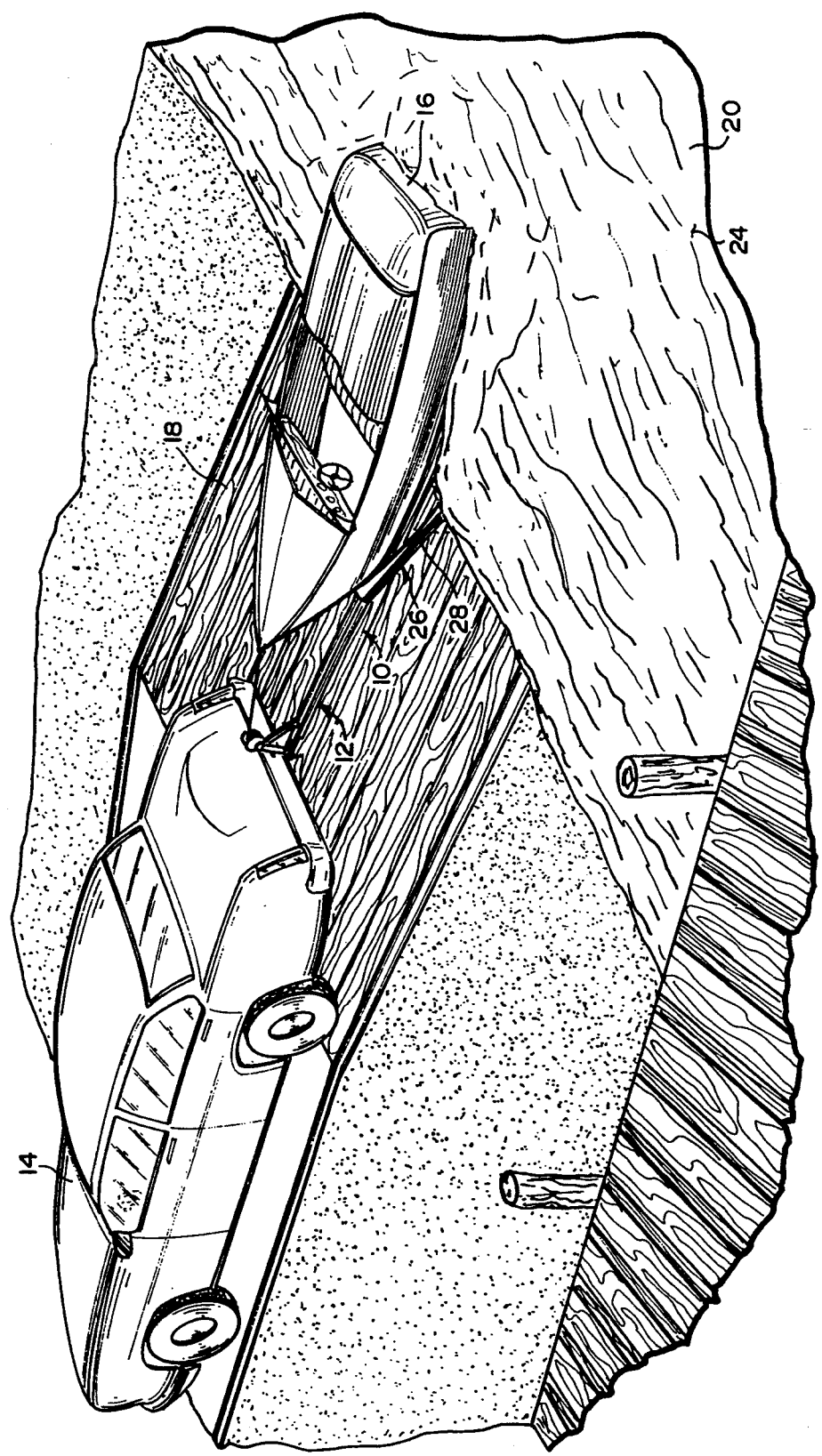
FIG. 1 is a perspective view showing a boat being launched into a body of water on a boat trailer hitched to a motor vehicle.

Turning now descriptively to the drawings, in which similar reference characters denote similar elements throughout the several views, FIGS. 1 through 6 illustrate a improved launching device 10, which consists of a structure 12 hitched to a motor vehicle 14, for hauling a boat 16 to a launch ramp 18 that extends into a body of water 20. An apparatus 22 on the hauling structure 12 is for indicating to a driver of the motor vehicle 14, the point of buoyancy of the boat 16 on the surface 24 of the body of water 20. The hauling structure 12 can be backed down just the right distance on the launch ramp 18 into the body of water 20, to accomplish the task of launching the boat 16 into the body of water 20.

The hauling structure 12 is a boat trailer 26 and includes a bed frame 28. A wheel assembly 30 is connected in a rotative manner to the bed frame 28, so as to ride down the launch ramp 18. A pair of bunk members 32 are affixed onto the bed frame 28. A pair of berth pads 34 are provided, with each mounted onto one bunk member 32, so as to carry the boat 16 thereon.

The indicating apparatus 22 contains an electronic signaling system 36, extending between one of the bunk members 32 in the boat trailer 26 and the interior of the motor vehicle 14. A component 38 is for activating the electronic signaling system 36, when the boat 16 lifts off of the berth pads 34 on the bunk members 32, as the boat 16 meets the point of buoyancy on the surface 24 of the body of water 20, so as to alert the driver of the motor vehicle 14.

The electronic signaling system 36, as shown in FIGS. 4 and 6, consists of a normally opened push button switch 40 at one of the bunk members 32 in the boat trailer 26, electrically connected in a circuit 42 to the battery 44 of the motor vehicle 14. An alarm signal 46 in the interior of the motor vehicle 14 is electrically connected in the circuit 42 to the battery 44 of the motor vehicle 14. When the push button switch 40 is closed, the alarm signal element 46 will alert the driver in the motor vehicle 14.

The activating component 38, as best seen in FIG. 4, includes a housing 48, for retaining the normally opened push button switch 40 mounted to one of the bunk members 32. A tripper arm assembly 50, pivotally affixed to the housing 48, has a first end in engagement with the boat 16 and a second end in engagement with the normally opened push button switch 40. When the boat 16 lifts off of the berth pads 34 on the bunk members 32, as the boat 16 meets the point of buoyancy on the surface 24 of the body of water 20, the second end of the tripper arm assembly 50 will close the normally opened push button switch 40 to activate the alarm signal element 46.

The tripper arm assembly 50 contains an elongated rod 52. A pin 54 extends through the housing 48 and transversely through the elongated rod 52, so that the elongated rod 52 can pivot on the pin 54. A ball 56 is attached to the first end of the elongated rod 52 to make contact with the boat 16. An expansion spring 58 extends between the elongated rod 52 and the housing 48, to force the elongated rod 52 to pivot on the pin 54, after the boat lifts off of the ball 56. The first end of the elongated rod 52 can press down on the normally opened push button switch 40 to close it.

The activating component 38, as shown in FIGS. 5 and 6, consists of one of the bunk members 32 having a longitudinal slot 60 therealong for retaining the normally opened push button switch 40 therein. A tripper assembly 62 is spring biased within the longitudinal slot 60 in the bunk member 32 above the normally opened push button switch 40 and below the respective berth pad 34. When the boat 16 lifts off of the berth pads 34 on the bunk members 32, as the boat 16 meets the point of buoyancy on the surface 24 of the body of water 20, the tripper assembly 62 will move upwardly to allow the normally opened push button switch 40 to close to activate the alarm signal element 46.

The tripper assembly 62 includes a pair of spaced apart threaded studs 64, extending upwardly in the longitudinal slot 60 in the bunk member 32 on opposite sides of the normally opened push button switch 40. A pair of springs 66 are provided, with each fitting onto one threaded stud 64. An elongated arm 68 supports the respective berth pad 34 and has opposite offset ends 70 with apertures therethrough, to fit onto the threaded studs 64 over the springs 66. A pair of nuts 72 are also provided, with each loosely threaded onto one threaded stud 64. The elongated arm 68 makes contact with the normally opened push button switch 40. When the elongated arm 68 moves up after the boat 16 lifts off, the normally opened push button switch 40 will close.

As shown in FIG. 4, the alarm signal element 46 can be an audio signal unit 74, which is a horn. The alarm signal element 46 can also be a visual signal unit 76, which is a light bulb.

LIST OF REFERENCE NUMBERS 10 improved launching device
12 hauling structure
14 motor vehicle
16 boat
18 launch ramp
20 body of water
22 indicating apparatus
24 surface of 20
26 boat trailer for 12
28 bed frame
30 wheel assembly on 28
32 bunk member on 28
34 berth pad on 32
36 electronic signaling system
38 activating component
40 normally opened push button switch
42 circuit
44 battery
46 alarm signal element
48 housing
50 tripper arm assembly
52 elongated rod
54 pin
56 ball
58 expansion spring
60 longitudinal slot in 32
62 tripper assembly
64 threaded stud
66 spring
68 elongated arm
70 off set end of 68
72 nut
74 audio signal unit for 46
76 visual signal unit for 46

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A improved launching device which comprises:

a) means hitched to a motor vehicle for hauling a boat to a launch ramp that extends into a body of water, said hauling means being a boat trailer, said boat trailer including a bed frame, a wheel assembly connected in a rotative manner to said bed frame, so as to ride down the launch ramp, a pair of bunk members affixed onto said bed frame, and a pair of berth pads, each mounted onto one said bunk member, so as to carry the boat thereon; and b) means on said hauling means, for indicting to a driver of the motor vehicle the point of buoyancy of the boat on the surface of the body of water, so that said hauling means can be backed down just the right distance on the launch ramp into the body of water, to accomplish the task of launching the boat into the body of water, said indicating means including an electronic signaling system extending between one of said bunk members in said boat trailer and the interior of the motor vehicle, and means for activating said electronic signaling system when the boat lifts off of said berth pads on said bunk members as the boat meets the point of buoyancy on the surface of the body of water, so as to alert the driver of the motor vehicle, said electronic signaling system including a normally opened push button switch at one of said bunk members in said boat trailer, electrically connected in a circuit to the batter of the motor vehicle, and an alarm signal element in the interior of the motor vehicle, electrically connected in the circuit to the batter of the motor vehicle so that when the push button switch is closed said alarm signal element will alert the driver in the motor vehicle, said activating means including a housing for retaining said normally opened push, button switch, mounted to one of said bunk members, and a tripper arm assembly pivotally affixed to said housing, having a first end in engagement with the boat and a second end in engagement with said normally opened push button switch, so that when the boat lifts off of said berth pads on said bunk members as the boat meets the point of buoyancy on the surface of the body of water, the second end of said tripper arm assembly will close said normally opened push button switch to activate said alarm signal element, said tripper arm assembly including an elongated rod, a pin extending through said housing and transversely through said elongated rod, so that said elongated rod can pivot on said pin, a ball attached to the first end of said elongated rod to make contact with the boat, and an expansion spring extending between said elongated rod and said housing, to force said elongated rod to pivot on said pin after the boat lifts off of said ball, so that the first end of said elongated rod can press down on said normally opened push button switch to close it, said activating means including one of said bunk members having a longitudinal slot therealong for retaining said normally opened push button switch therein, and a tripper assembly spring biased within said longitudinal slot in said bunk member above said normally opened push button switch and below said respective berth pad, so that when the boat lifts off of said berth pads on said bunk members, as the boat meets the point of buoyancy on the surface of the body of water, said tripper assembly will move upwardly to allow said normally opened push button switch to close to activate said alarm signal element, said alarm signal element being an audio signal unit, said audio signal unit being a horn, said alarm signal element being a visual signal unit, said visual signal unit being a light bulb.

2. A improved launching device as recited in claim 1, wherein said tripper assembly includes:
   a) a pair of spaced apart threaded studs extending upwardly in said longitudinal slot in said bunk member on opposite sides of said normally opened push button switch;
   b) a pair of springs, each to fit onto one said threaded stud;
   c) an elongated arm supporting said respective berth pad and having opposite offset ends with apertures therethrough to fit onto said threaded studs over said springs; and
   d) a pair of nuts, each to loosely thread onto one said threaded stud, with said elongated arm making contact with said normally opened push button switch, so that when said elongated arm moves up after the boat lifts off, said normally opened push button switch will close.

* * * * *